(12) United States Patent
Grechanik et al.

(10) Patent No.: US 8,572,570 B2
(45) Date of Patent: Oct. 29, 2013

(54) ASSISTED COMPOSITIONAL REASONING FOR TEST SCRIPTS

(75) Inventors: Mark Grechanik, Chicago, IL (US);
Qing Xie, Chicago, IL (US); Chen Fu, Lisle, IL (US)

(73) Assignee: Accenture Global Services Limited, Dublin (IE)

( * ) Notice: Subject to any disclaimer, the term of this patent is extended or adjusted under 35 U.S.C. 154(b) by 576 days.

(21) Appl. No.: 12/813,405

(22) Filed: Jun. 10, 2010

(65) Prior Publication Data

US 2011/0307864 A1    Dec. 15, 2011

(51) Int. Cl.
*G06F 9/44* (2006.01)
(52) U.S. Cl.
USPC ......................................................... 717/124
(58) Field of Classification Search
USPC .................................................. 717/124–126
See application file for complete search history.

(56) References Cited

U.S. PATENT DOCUMENTS

| | | | |
|---|---|---|---|
| 6,990,654 B2 | 1/2006 | Carroll, Jr. | |
| 7,546,602 B2 | 6/2009 | Hejlsberg et al. | |
| 7,716,662 B2 | 5/2010 | Seiden | |
| 8,151,276 B2 * | 4/2012 | Grechanik et al. | 719/316 |
| 2004/0002818 A1 | 1/2004 | Kulp et al. | |
| 2006/0015847 A1 | 1/2006 | Carroll, Jr. | |
| 2006/0168577 A1 | 7/2006 | Melo et al. | |
| 2007/0143398 A1 | 6/2007 | Graham | |
| 2007/0240118 A1 * | 10/2007 | Keren | 717/124 |
| 2007/0271203 A1 | 11/2007 | Delvat | |
| 2009/0217250 A1 | 8/2009 | Grechanik et al. | |
| 2009/0217302 A1 | 8/2009 | Grechanik et al. | |

OTHER PUBLICATIONS

Fu et al., "Inferring Types of References to GUI Objects in Test Scripts", Apr. 1-4, 2009, 2009 2nd International Conference on Software Testing Verification and Validation (ICST 2009) pp. 1-10.*
Vallet et al., "Inferring the Most Important Types of a Query: a Semantic Approach", Jul. 20-24, 2008, ACM 978-1-60558-164—Apr. 8, 2007, pp. 1-2.*
United States Patent and Trademark Office Action dated Dec. 13, 2010 for corresponding U.S. Appl. No. 12/038,658.
Compuware, The Leader in IT Value, "Accelerate Testing and Deliver High Quality Applications on Time," 2008 Compuware Corporation, 2 pages.
Grechanik et al., "Reducing Effort in Script-Based Testing," Accenture Technology Labs, Systems Integration Group, Chicago, Illinois, Nov. 11, 2007, pp. 1-22.
Hewlett-Packard Development Company, "HP Functional Testing Software, BTO Software," 2008, 1 page.

(Continued)

*Primary Examiner* — Anna Deng
(74) *Attorney, Agent, or Firm* — Brinks Hofer Gilson & Lione

(57) ABSTRACT

Assisted compositional reasoning for test scripts is implemented by a Type Inference of GUI Object References (TIGOR). TIGOR makes types of GUI objects explicit in the source code by using the properties of GUI objects as referred to in test script statements to access a GUI object repository for GUI objects that have matching GUI objects properties. TIGOR analyzes the GUI object types of the matching GUI objects in view of a sequence of operations performed on the GUI objects in the test script statements. TIGOR infers a GUI object type for a GUI object when that GUI object type is determined to be valid and/or compatible with a sequence of operations, such as API calls, executed in test script statements that perform actions on the GUI object.

18 Claims, 15 Drawing Sheets

(56) References Cited

OTHER PUBLICATIONS

Hewlett-Packard Development Company, HP QuickTest Professional Software, data sheet, 2007, 4 pages.
IBM, "Rational Robot, Features and Benefits," "Rational Software," undated, 1 page.
IBM, "Rational Robot, Overview," "Rational Software," undated, 1 page.
Pierce, Benjamin C., "Types and Programming Languages," The MIT Press, Cambridge, Massachusetts, 2008, ISBN 0-262-16209-1, complete book.
Mark Grechanik, Qing Xie, and Chen Fu, Assisting Compositional Reasoning About Test Scripts by Inferring Types of References to GUI Objects, Accenture Technology Labs, Chicago, Illinois, Aug. 11, 2009, pp. 1-21, *Softw. Test. Verif. Reliab.* 2009; 00:1-7, published online in Wiley InterScience (www.interscience.wiley.com), DOI: 10.1002/000.

* cited by examiner

| EXPENSES – ExpensAble | | | |
|---|---|---|---|
| File Edit View Lists Reports Online Submit Help | | | |

| FirstFolder | Envelope Name | Amount Due | Paid | Created |
|---|---|---|---|---|
| Main Folder 602 | University | $0 | | 10/11/06 |
| | Company 604 | $9,086.89 | | 09/07/06 |

Total Reimbursable: 9,086.89    For This Folder: 9,086.89

Test Script 2

Start("PIE").Combo("Invoices").Select("For Chicago')

if( Get("PIE").Title().Get != "Chicago Invoices")
    report error;

Get("PIE"). ListBox ("Invoices").Select( 1 )

if( Get("PIE"). GetEntry ("City"). GetText != "Chicago")
    report error;
if( Get("PIE"). GetEntry ("Amount"). GetText !=
        Integer.ToString(1000) )
    report error;

Figure 12

A New Composed Test Script

```
Start("QE").ListBox ("Portfolio").Select( 1 )
Get("QE").ListBox ("Portfolio").Click
    Start("PIE").Combo("Invoices").Select( "For Chicago' )
if( Get("QE").ListBox   ("Detail").Select( 0 ) != "Company" )
    report error;
    if( Get("PIE").Title().Get != "Chicago Invoices" )
    report error;
Get("PIE").ListBox ("Invoices").Select( 1 )
Get("QE").ListBox ("Detail").Click
    if( Get("QE").Edit("City").GetText !=
                Get("PIE").GetEntry ("City"). GetText)
        report error;
    if( Get("QE").Edit("Amount"). GetInteger !=
Get("PIE").GetEntry ("Amount").GetText   )  //report type mismatch here
        report error;
```

1302 → (brace)
1300 →

Figure 13

Type Inferencer Message Guide Repository messages:

TIM-1: At line 7 of the test script 202 accesses WinObject ("Select School") that returns multiple type inference results. Please choose the GUI object type for the GAPs (332, 334).

TIM-2: At line 6 of the composed test script 216 may select the wrong GUI object type 124 because multiple type inference results 136 were returned.

Figure 15

ASSISTED COMPOSITIONAL REASONING FOR TEST SCRIPTS

BACKGROUND OF THE INVENTION

1. Technical Field

This disclosure relates to analysis and generation of accurate GUI object type inferences for testing applications that contain these GUI objects. The inferences may be used to create composed test scripts for testing applications composed of multiple applications, including graphical user interface applications, and in particular relates to transforming multiple individual test scripts that are designed to individually test standalone GUI applications into fewer test scripts or a single composed test script for testing a composed application composed of multiple applications.

2. Related Art

The relentless pace of advancing technology has given rise to complex computer software applications to help automate almost every aspect of day-to-day existence. Today applications exist to assist with writing novels to filing income tax returns to analyzing historical trends in baby names. One nearly ubiquitous feature of these applications is that they employ graphical user interfaces (GUIs). Another nearly ubiquitous aspect is that applications that incorporate GUIs (Graphical user interface APplications (GAPs)) require thorough testing prior to release.

Integrated systems are composed of components that exchange information. These components include different legacy event-based applications, such as GAPs. To automate testing, engineers create test scripts that are programs that interact with GAPs by performing actions on the GUI objects of the GAPS. When testing integrated systems and composed applications in particular, it is important to reason about how to compose test scripts whose operations reference these GUI objects.

Successfully combining existing individual test scripts that are designed to test individual applications in order to test composed applications is difficult. The significant complexity of combining test scripts, and the permutations and combinations of GUI elements, including data types, gives rise to an enormous field of potential commands and command sequences that could have bugs of any severity, from insignificant to critical failure. As a result, even if test scripts exist for the applications, it is rarely the case that the test scripts can be easily combined without significant effort to adequately test the composed application. The complexity is further complicated, because unlike conventional languages that require programmers to declare types of variables explicitly, test script statements reference GUI objects using the properties (e.g., location, color, and size) of the GUI objects. The absence of data type information exacerbates the process of composing test scripts, making it expensive and prohibitive to test composed systems. These fundamental problems are inherent for most existing Open Source and commercial automated testing tools.

Several fundamental problems make it difficult to type operations that reference GUI objects in test scripts. First, specifications for GUI objects are often not available, and these objects are created dynamically in the GAPs' processes and the contexts of the underlying GUI frameworks (e.g., Windows or Java SWT). Black-box testing does not provide the option to obtain information about GUI objects from the source code of GAPs. Therefore, test engineers use capture/replay tools to extract values of properties of GUI objects, so that these objects can be later identified on GUI screens by matching these prerecorded values with the properties of GUI objects that are created at runtime. Because complete specifications of GUI objects are not available, it is difficult to analyze statically how GUI objects are accessed and manipulated by test script statements.

Manually testing large-scale composed applications with composed test scripts is tedious, error prone, and laborious. Nontrivial GAPs contain hundreds of GUI screens that in turn contain thousands of GUI objects. In order to automate testing of GAPs, test engineers write programs using scripting languages (e.g., JavaScript and VBScript), and these testing scripts drive GAPs through different states by mimicking users who interact with these GAPs by performing actions on their GUI objects. Often test scripts simulate users of GAPs, and their statements access and manipulate GUI objects of these GAPs. For example, the statement:

VbWindow("UserId").VbEdit("txtAgentsName").Set "Shawn"

locates a window whose caption is Userid and that is created by a Visual Basic-based control, then a text box is located whose name is txtAgentsName that is a GUI object whose parent is the Userid window. By calling the method Set with the parameter "Shawn", the value of the text box is set to "Shawn".

Commercial tools such as Quick Test Pro (QTP), Rational Robot, and Compuware Test Partner help generate test scripts by tracking pointing of a cursor at GUI objects and performing desired actions. These tools generate scripting code that can replay captured user actions for an individual application. The generated code serves as a skeleton for creating scripts to automate script testing for individual applications. When test scripts are combined to create a composed test script, test engineers add code manually to the composed test script so that the composed test script performs actions on the GUI objects as previously exercised by the individual test scripts.

Using manually written code to combine individual test scripts in order to test composed applications makes the composed test scripts more complex, time consuming to create, and difficult to accurately implement, maintain, and evolve. Although it is known in advance that the test scripts access and manipulate GUI elements, it is not clear how to detect GUI object data types, without significant manual analysis and reasoning, until compile time which lead to runtime errors.

Using API calls exported by testing platforms remains a primary mode of accessing and manipulating GUI objects of GAPs. Operation statements in the test scripts include API calls that perform actions on GUI objects referenced in the test scripts incorporated in the applications tested by the scripts. When the operation statements fail to properly manage the GUI object data types of the GUI objects referenced in the test scripts, these API calls lead to various run-time errors.

Checking test scripts for potential flaws caused by API calls that lead to incorrect tests and runtime errors in the test scripts is a difficult technical challenge. Furthermore, there are fundamental problems with using API calls to access and manipulate GUI objects. First, the API calls take names and property values of GUI objects as string input parameter variables. The values of these input parameters are often known only at runtime, making it impossible to apply sound checking algorithms. Second, testing platforms export dozens of different API calls, and high complexity of these API calls makes it difficult for programmers to understand which API calls to use and how to combine them to access and manipulate GUI objects. These problems lead to a wide range of bugs in the test scripts, many of which are difficult to detect during the inspection of the test script source code.

Therefore, a need exists to address the problems noted above and other previously encountered.

SUMMARY

Assisted compositional reasoning for test scripts is implemented by the Type Inference of GUI Object References (TIGOR) system and method. TIGOR facilitates making types of GUI objects explicit in the source code, allowing test engineers to reason more effectively about the interactions between statements in complex test scripts and GUI objects that these statements reference. In one implementation, TIGOR includes logic that automatically infers GUI object types referenced in the operational statements of the test scripts. TIGOR provides a tool for developing and testing applications composed with multiple applications that include GUI objects. TIGOR is practical and efficient, and yields appropriate GUI objects types that provide error free control of GUI objects referenced in composed test scripts to test composed applications.

Crafting test scripts from scratch for testing new integrated systems is a significant investment. Test engineers implement sophisticated testing logic. Specifically test engineers write code that processes input data, uses this data to set values of GUI objects, acts on the objects to cause GAPs to perform computations, retrieves the results of these computations from GUI objects, and compares these results with predetermined answers to determine if GAPs behave as desired. Since multiple test scripts are already created for testing individual GAPs, it is highly desirable that these scripts be reused for testing the corresponding integrated systems. Reusing testing logic repeatedly is the ultimate goal of test automation.

However, it is difficult to compose test scripts into mega-scripts that test newly integrated systems, because many of these scripts are difficult to reason about, and the test scripts are often out-of-date, and should be fixed before being composed with other scripts. In addition, operations in test scripts should be synchronized, so that composed scripts can facilitate GAPs to exchange data when GUI objects are exposed to these exchanges. Specifically, test engineers should know what types of GUI objects are referenced by expressions in test scripts in order to determine how to move data between test scripts. Scripting languages do not allow programmers to specify types of variables. Unlike conventional languages that require programmers to declare types of variables explicitly, test script statements reference GUI objects using their properties (e.g., name, location, color, and size).

Test scripts are highly sensitive to the types of GUI objects that the test scripts reference, for example, changing the type of a GUI object from a list box to a text box will lead to runtime errors in test scripts. Test script statements that access and manipulate GUI objects as failures if these statements are broken because of mismatches between types of GUI objects that methods are invoked on the references of the GUI objects in test scripts statements. Test engineers put a lot of effort into detecting and understanding failures, so that the test engineers can fix test scripts to work on modified versions of GAPs.

TIGOR assists compositional reasoning about test scripts by inferring the data types of GUI objects on which a test script performs actions. TIGOR, in one implementation, operates in combination with a testing tool, such as that manufactured by Hewlett-Packard Corp. referred to as the Quick Test Pro (QTP™ tool).

Other systems, methods, features and advantages will be, or will become, apparent to one with skill in the art upon examination of the following figures and detailed description. All such additional systems, methods, features and advantages are included within this description, are within the scope of the claimed subject matter, and are protected by the following claims.

BRIEF DESCRIPTION OF THE DRAWINGS

The Type Inference of GUI Object References (TIGOR) may be better understood with reference to the following drawings and description. The elements in the figures are not necessarily to scale, emphasis instead being placed upon illustrating the principles of the system. In the figures, like-referenced numerals designate corresponding parts throughout the different views.

FIG. 6 shows a sample second GUI object reference in a sequence to a destination GUI object.

FIG. 12 shows another sample sequence of test script statements.

FIG. 13 shows a sample composed sequence of test script statements.

FIG. 15 shows type inference message guide repository messages.

DETAILED DESCRIPTION OF THE PREFERRED EMBODIMENTS

The Type Inference of GUI Object References (TIGOR) assists compositional reasoning about test scripts by inferring the data types of GUI objects on which a composed test script performs actions.

Figure 1:
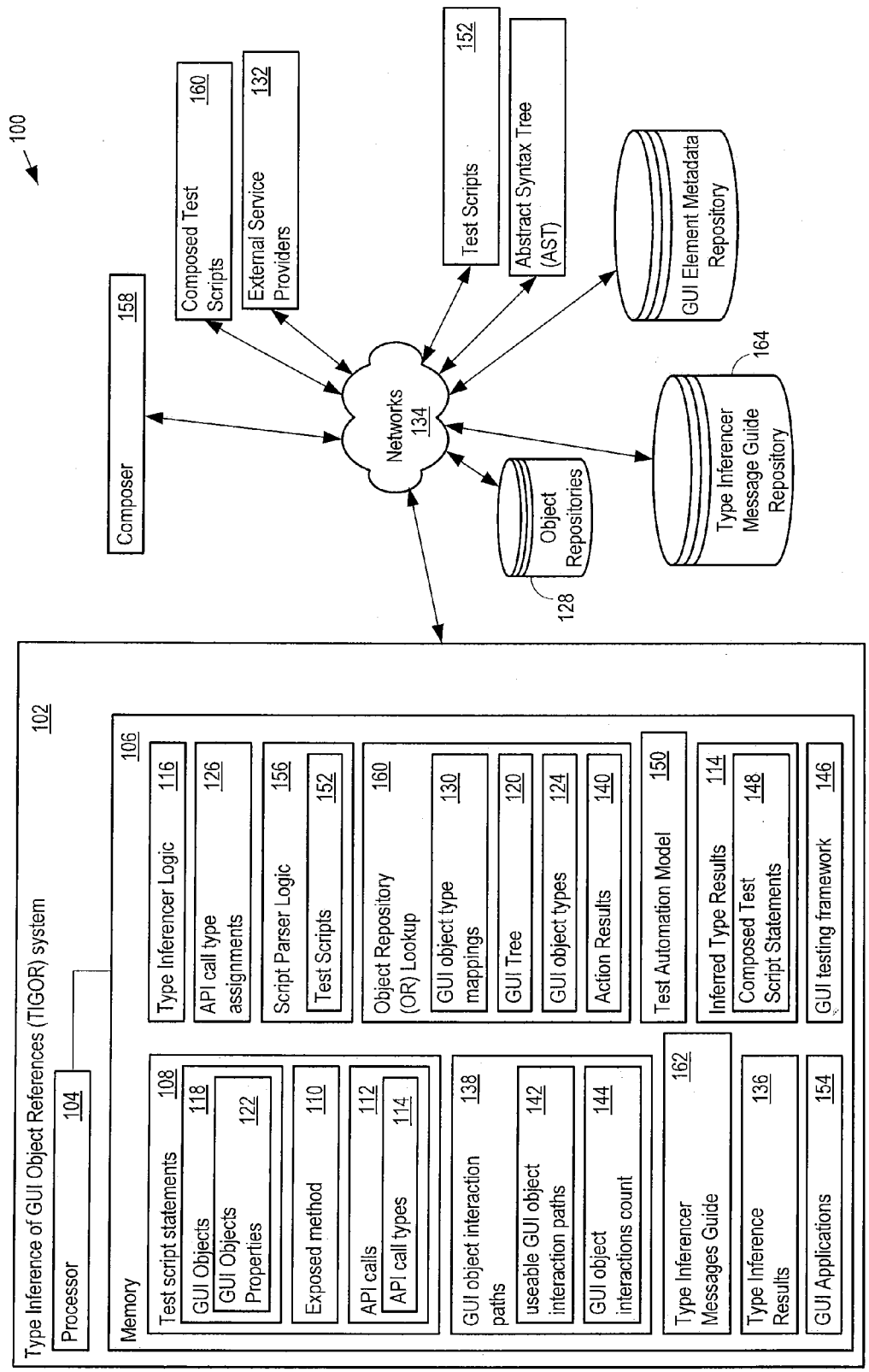
FIG. 1 illustrates an example Type Inference of GUI Object References (TIGOR) system architecture.

FIG. 1 illustrates an example TIGOR system architecture 100. The TIGOR system architecture 100 includes a system 102 that includes a processor 104 and a memory 106 coupled to the processor 104. The memory 106 includes a test script statement 108 that includes an exposed method 110 expressed in the test script statement 108, and Application Programming Interface (API) calls 112, characterized by API call types 114, that navigate to the exposed method 110 and lead in sequence in the test script statement 108 to the exposed method 110. The type inferencer logic 116, stored in the memory 106, when executed by the processor 104, causes the processor 104 to determine a destination GUI object 118 that exposes the exposed method 110 and finds an element path between sequential GUI objects in a GUI tree 120. The GUI object 118 includes GUI objects properties 122, and the element path leads to the destination GUI object 118. The sequential GUI objects are characterized by GUI object types 124. The type inferencer logic 116 determines whether the API call types 114 in the element path between sequential GUI objects 118 are compatible with the GUI object types in the sequence. The type inferencer logic 116 determines API call type assignments 126 for each API call 112 according to the action results 126 that specify valid API calls 112 useable to perform actions on particular GUI object types 122.

The TIGOR system architecture 100 includes a GUI object repository or GUI object repositories 128 that stores validated action results 140 for actions performed by the API calls 112 on GUI object types 124. For example, the statement:

VbWindow("UserId").VbEdit("txtAgentsName").Set "Shawn"

locates (action result 140) a window whose caption is Userid and that is created by a Visual Basic-based control, then a text box (GUI object type 124) is located whose name is txtAgentsName and is a GUI object 118 whose parent is the Userid window. By calling the method 'Set' with the parameter "Shawn", the value of the text box is set to "Shawn" (action result 140, in this example, sets a value).

The type inferencer logic 116 determines the GUI object types 124 by obtaining, from the GUI object repositories 128, mappings of GUI object types 130, where each of the mappings 130 may comprise properties of a GUI object type 124. Example properties include location, color, and size of the GUI objects. The type inferencer logic 116 may assign GUI object types 124 to each GUI object 118 according to the API call types 114 in sequence determined to be compatible with the GUI object types in sequence 142.

In one implementation, the TIGOR system architecture 100 includes one or more external GUI object repositories 128. The object repositories 128 may be provided by an external service provider or providers 132 and may be accessed through the network 134. The multiple external GUI object repositories 128 store mappings 130 for the GUI objects 118 in applications that do not compose the composed application 154. These applications may reference the GUI objects 118 referenced in the test script statements 108. In one implementation, the larger the inventory of mappings 130 for GUI objects 118 available in the GUI object repositories 128, including external GUI object repositories 128, the more accurate the inference result 136. For example, an external service provider 132 may offer access to any number of GUI object repositories 128, both GUI object repositories 128 related and unrelated to the applications 154 used to compose the composed application 154, through a network 134, in order to increase the inventory of mappings 130 for GUI objects 118 used by TIGOR 100 to obtain the type inference results 136. The GUI object repositories 128 store the mapping 130 of names of GUI objects 118 and the physical properties 122 of the GUI objects that describe how those GUI objects 118 are represented.

The type inferencer logic 116 may find multiple GUI object interaction paths 138 that identify API calls 112 that perform actions 140 on the sequential GUI objects. For example, the GUI object interaction paths 138 may include the sequence of GUI objects referenced in a sequence of test script statements and composed test script statements (148, 152). Recall, the statement:

VbWindow("UserId").VbEdit("txtAgentsName").Set "Shawn"

locates a window whose caption is Userid and that is created by a Visual Basic-based control, then a text box is located whose name is txtAgentsName and is a GUI object whose parent is the Userid window. By calling the method Set with the parameter "Shawn", the value of the text box is set to "Shawn". The sequence of GUI objects 118 referenced in this example may include in one path a window GUI object and a text box GUI object. The text box GUI object is the destination GUI object in this example and 'set' is the action results 140 performed on the GUI object 118.

The GUI object interaction paths 138 may validate useable GUI object interaction paths 142 from the multiple GUI object interaction paths 138 that control the actions 140 performed on the sequential GUI objects, and determines a GUI object interactions count 144 in each of the useable GUI object interaction paths 142. For example, the 'set' action result 140 is valid for a text box GUI object type and the 'set' operation counts as a GUI object interactions count 144 in a useable GUI object interaction path 142.

In one implementation, the type inferencer logic 116 may select, from the useable GUI object interaction paths 142, a first path having the least number of GUI object interactions 144 of the useable GUI object interaction paths 142. In another implementation, the type inferencer logic 116 selects from the useable GUI object interaction paths 142, a first path having the greatest number of GUI object interactions 144 of the useable GUI object interaction paths 142. In still another implementation, the type inferencer logic 116 selects from the useable GUI object interaction paths 142, a first path having a number of GUI object interactions 144 between the least and the greatest number of GUI object interactions 144 of the useable GUI object interaction paths 142. The type inferencer logic 116 determines the type of the exposed method 110 in the useable GUI object interaction paths 142, where the useable GUI object interaction paths 142 each extend from a root node (e.g., see FIG. 9 GUI object 902) to the destination GUI object 118 (e.g., see FIG. 9 GUI object 910) that exposes the exposed method 110.

For example, the test script statement 108 may include VbWindow ("State").Select 3. The API call 112 VbWindow is exported by a GUI testing framework 146. Executing the API call 112 identifies a list box GUI object 118 whose property "name" (e.g., GUI objects properties 122) has the value "State" (e.g., action results 140). By calling the method 110 'Select' with the value 3, the third item in its value list is selected. However, if the referenced GUI object 118 is not of the GUI object type 'list box' (e.g., a special form of a 'text box' type), the API call 112 will result in a runtime exception. The absence of typing information in the source code (e.g., in the test script statement 108) exacerbate the process of detecting and understanding failures in test scripts 108, making maintenance and evolution of these scripts 152 expensive and prohibitive, thus obliterating benefits of test automation 150. Test engineers often lack time and necessary skills to understand old scripts, especially if these scripts were created by other engineers. To be able to compose and synchronize test scripts 148, it is critical for test engineers to understand what types 124 of GUI objects are referenced in the expressions of these scripts 148. Existing approaches provide lithe help to address this pervasive and big problem.

TIGOR 100 makes types of GUI objects 124 explicit, enabling test engineers to reason more effectively about the interactions 142 between statements in complex test scripts 152 and GUI objects 118 that these statements 108 reference. TIGOR 100 provides a way to synchronize test scripts (148, 152) and create composed test script statements 148 in order to test composed applications 154.

For example, a composed application 154 may include E-procurement systems (EPS) that businesses employ that often include different GAPs assisting different steps of the purchasing process. In EPSes, the rule of separation of duty requires that operations be separated into different steps that must be done by independent persons (agents) in order to maintain integrity. With the separation of duty rule in place, no person can cause a problem that will go unnoticed, since a person who creates or certifies a transaction may not execute the transaction. Implementing this rule results in agents using different GAPs 154 that provide different services for different steps of the purchasing process.

Employees order items using an electronic shopping cart service of the web-based application buystuff (BS). Department managers review selected items in the shopping cart, approve and order them, and enter the ordered items into expense tracker (ET), a third-party closed and monolithic Windows GAP that the company uses internally to keep track of purchases. The BS service sends a notification to a company accountant, who uses a closed and monolithic GAP called Invoice tracker (IT) to create invoices for ordered goods. When the ordered goods are received from BS, a receiving agent compares them with the entries in ET. The accountant can view but cannot modify records in ET, and likewise, no other agent but the accountant can insert and modify data in IT. If the received goods correspond to the records in ET, the receiving agent marks the entries for the received goods in ET and notifies the accountant. After comparing the invoices in IT with the marked entries in ET and determining that they match, the accountant authorizes payments.

Each procurement agent uses different GAPs 154 to accomplish different goals. Sometimes, several GAPs 154 should be used to accomplish a single goal, and agents have to transfer data between these GAPs 154 and perform other operations manually. Clearly, automating these activities 140 is important in order to improve the quality and the efficiency of business services.

Consolidating disparate components into integrated EPSes facilitates enterprises to achieve a high degree of automation of their purchasing processes. One supporting function of an integrated system (composed application 154) is to extract information about ordered items from the service BS and create and enter invoices into IT using this information. Once the payments are processed, the user marks invoices in IT as paid, and the information about these invoices should be extracted from IT and entered as expenses into ET. There are many other functions of the integrated EPS that involve interoperating GAPs 154 with each other.

An important function of testing an integrated EPS is to use individual test scripts 152 that are designed for components GAPs 154 to perform integrated tasks 140. These scripts may continue to work with legacy GAPs 154, and operations synchronized in order to facilitate GAPs 154 to exchange data. The test scripts 152 and composed test script statements 148 may be synchronized in order to facilitate GAPs 154 to exchange data. In a way, composing test scripts 148 mimic how users interact with integrated systems 154. Composing test scripts 148 this way requires test engineers to reason about types 124 of GUI objects that these scripts 152 reference.

In another implementation, TIGOR 100 includes a test automation model 150 that illustrates interactions between test scripts 152 and GAPs 154. Statements of test scripts 108 are processed by the scripting language interpreter 156. In one implementation, the scripting language interpreter (and/or script parser logic) 156 is supplied with a testing platform. When the interpreter 156 encounters statements 108 that access and manipulate GUI objects 118, the interpreter 156 passes the control to the testing platform 152 that translates these statements 108 into a series of instructions that are executed by the underlying GUI framework 146 and the operating system.

The layers between test scripts 152 and GAPs 154 may be viewed as a reflective connector. A connector is a channel that transmits and executes operations (e.g., API calls 112) between test scripts (148, 152) and GAPs 154. Reflection exposes the type 124 of a given GUI object 118, and facilitates test scripts (148, 152) to invoke methods 110 of objects 118 whose types 124 and classes are not statically known before the GAP 154 is run. A connector between scripts (148, 152) and GAPs 154 is combined with reflection so that test scripts (148, 152) can access and manipulate GUI objects 118 at run-time.

Each statement 108 in test scripts (148, 152), which accesses and manipulates GUI objects 118 may include the following operations: (1) navigate to some destination GUI object 142, using GUI object properties 122, and (2) invoke methods 110 to perform actions 140 on the GUI objects 118, including getting and setting values 140. Using implementations of the concepts of reflection and connector, statements 108 in test scripts 152 can navigate GUI objects 118 in GAPs 154 and perform operations 140 on these GUI objects 118.

Figure 2:
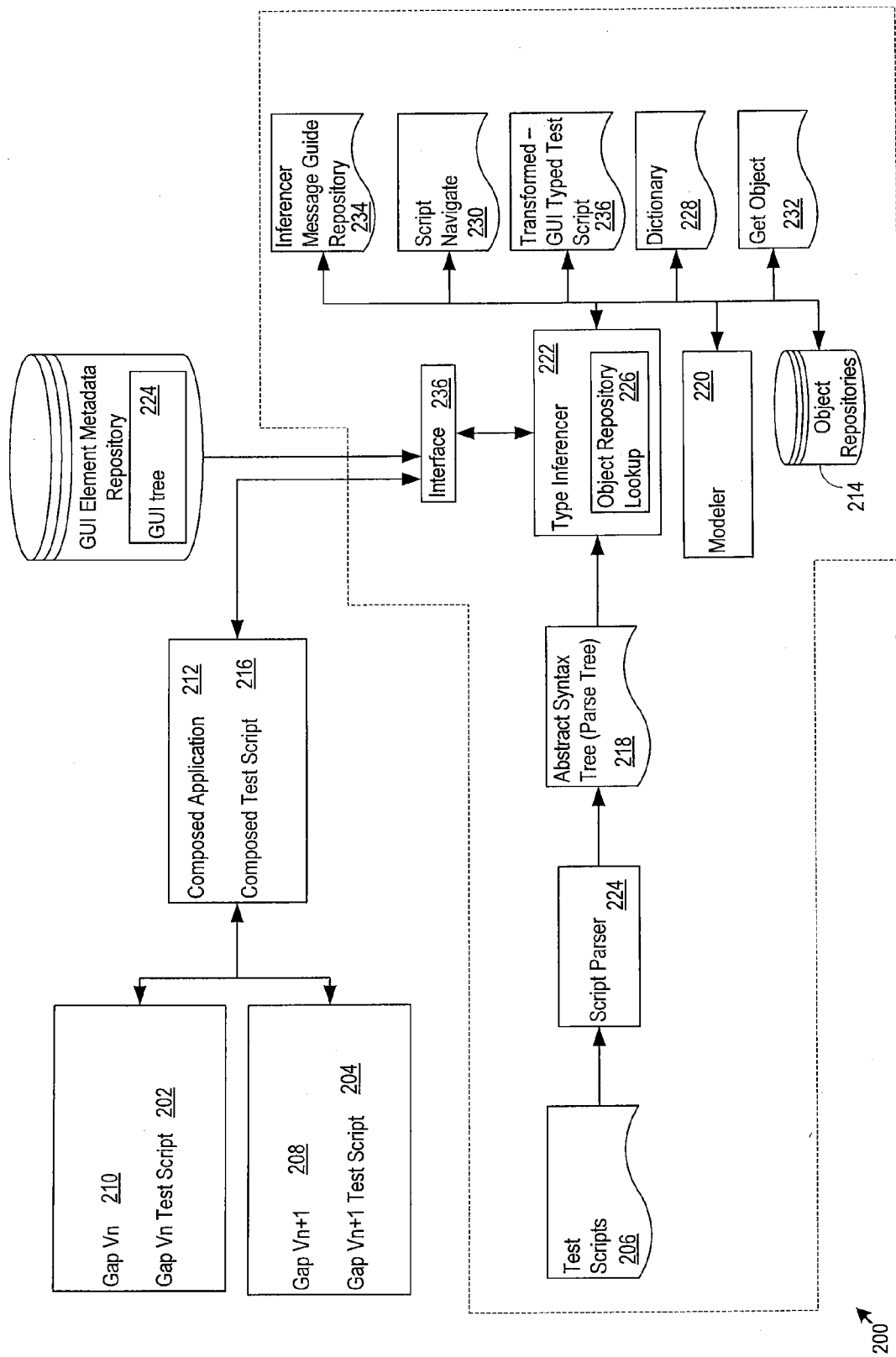
FIG. 2 shows an example TIGOR architecture.

FIG. 2 shows an example TIGOR architecture' 200. In order to facilitate type checking of references to GUI objects 118 in test scripts and test script statements (108, 202, 204, and 206) statically, mappings 130 between actual GUI objects 118 in GAPs (208 and 210) and the GUI objects references in test scripts and test script statements (108, 202, 204, and 206) are established. GUI objects 118 are referenced in test scripts and test script statements (108, 202 and 204) using API calls 112 that are exported by the underlying testing platforms 146. The testing parameters to these API calls 112 are string variables whose values are the names of entries in the object repositories (128, 214) that contain values of properties of corresponding GUI objects 118. If these parameters are constants, then their corresponding GUI objects 118 can be identified at compile time, and references to these GUI objects 118 in test scripts and test script statements (108, 202 and 204) can be type checked statically. The TIGOR architecture 200 approximates type inferences 136 of these GUI objects references to help test engineers to reason about type safety, and create and execute composed test scripts 210 for testing composed applications 212.

FIG. 2 shows command and data flows as arrows between components of the TIGOR architecture 200. The inputs to the TIGOR architecture 200 are the GUI objects 118 of the running GAPs (208 and 210), the object repositories 214, and the test scripts (108, 202, and 204) for the GAPs (208, 210, and 212). GUIs 118 of GAPs (208 and 210) are modeled as trees (120, 224, an abstract syntax tree 218) whose nodes are composite GUI objects 118 (e.g., frame) that contain other GUI objects, leaves are primitive or simple GUI objects (e.g., buttons), and parent-child relationships between nodes (or nodes and leaves) defines a containment hierarchy. The root of the tree 120 is the top container window. The GUI Modeler 220 obtains information about the structure of the GUI and all properties of individual objects 118 and the GUI outputs (action results 140) referenced in the GUI tree 120.

In one implementation, a TIGOR composer 158, discussed in detail under FIG. 3 below, models the GAPs (208, 210, and 212). The trees (120, 218, 224) that model GUIs are input to the type inferencer 222, which infers types of references to GUI objects 118 in test scripts (108, 202, and 204). The script 206 for the GAP (208, 210, and 212) is parsed using the script parser 224 and the parse tree 218 is generated. The parse tree 218 contains an intermediate tree representation of the test script (108, 202, and 204) where references to GUI objects 118 are represented as nodes. Recall that GUI objects 118 are described using unique names with which property 122 values of these objects 118 are indexed in object repositories 214. The names for the GUI objects 118 are resolved into the values of properties 122 of GUI objects 118 using an OR Lookup 226 into the object repositories 214. The type inferencer 222 takes the parse tree 218, the GUI tree (224, 120), and values of properties 122 of GUI objects 118 as inputs and produces a dictionary 228 that maps 130 references to GUI objects 118 in test scripts (108, 202, and 204) to their GUI objects types 124 in GAPs (208, 210, and 212). For example, this dictionary 228 can be implemented as comments in test scripts (108, 202, and 204) that accompany references to GUI objects and/or messages in an inference message repository 234.

The TIGOR architecture 200 includes script navigate logic 230 (see Table 1) that is executed on the script side to obtain the object v which is contained in the GUI object 118 that is referenced in the test script (108, 202, and 204) using the object $o_T$. The properties of the returned object v are defined in the object repositories 214 under the name p. The script navigate 230 breaks an operation into multiple operations, locating and navigating to the GUI object 118 in the corresponding applications, determine the state of the application when the GUI object is active, locates the GUI object by identifying by matching the recorded properties in the test script in a object repository. Next the GUI object type is matched to the operation to be performed as identified by a composed test script.

The test scripts (108, 202, and 204) are combined into a composed test script by implementing statements that exchange data for a composed GUI object that corresponds to GUI objects in the first and the second applications. Composed test script statements in the composed test script pass data from the statements of one test script to the statements of a second test script for the first and second applications. The statements of the first and second scripts process data of the different types of the GUI object as referenced in the multiple applications. The statements pass information from one script to the other script, while managing the differences in the types of the GUI objects as referenced in the multiple applications.

For example, a first GUI object referred to as user ID represented as a string ("robert") in the first application, a second GUI object referred to as user ID represented as an integer ("01234567") in the second application, and user ID represented in the combined application as a different type of GUI object (e.g., an alpha numeric value "robert01"). The first GUI object referred to as user ID represented as a string ("robert") in the first application—operations performed on the first GUI object may include reading the name from the GUI object and then performing the operation to reverse the string or some other operation. The second GUI object referred to as user ID represented as an integer—operations performed on the second GUI object as an integer may be clearly distinct from the operations performed on the first GUI object.

TABLE 1

Example Script Navigate logic

SCRIPTNAVIGATE $$\frac{v = S_T(o_T) \cdot navigate(p)}{\langle T, S_T \rangle \vdash identify(o_T, OR(p)) = v}$$

The TIGOR architecture 200 includes Get Object logic 232 (see Table 2) that is executed on the GAP side to obtain the collection of objects v, which are contained in the GUI object 118 that is referenced in the GAP using the object oG.

TABLE 2

Example Get Object logic

GETOBJECT $$\frac{v = \{o \mid S_G(o_G) \cdot child(\{p_i \mapsto v_i\})\}}{\langle G, S_G \rangle \vdash getObject(o_G, v_1, \ldots, v_i) = v}$$

The TIGOR architecture 200 includes MCALL logic (see Table 3) may evaluate a test script expression (test script statement 108) that references a GAP object to wait for the result of the action 140 performed on the GAP 154.

TABLE 3

Example MCALL logic $\langle T,E[o_T \cdot m(v_1,\ldots,v_n)],S_T \rangle,\langle G,a,S_G \rangle,TS \hookrightarrow \langle E[wait(r)],S_T \rangle,\langle G,[remote\ r = o_G \cdot m(v'_1,\ldots,v'_n)],S_G \rangle,TS$ The TIGOR architecture 200 includes CALLRETURN logic (see Table 4) that returns the result 140 of method execution 110 from the GAP 154 to the test script 152, and EXECGAP logic (see Table 5) that evaluates the action 140 at the GAP 154. E stands for the context in which a given rule is applied.

TABLE 4

Example CALLRETURN logic $\langle T,E[o_T \cdot m(v_1,\ldots,v_n)],S_T \rangle,\langle G,a,S_G \rangle,TS \hookrightarrow \langle E[wait(r)],S_T \rangle,\langle G,[remote\ r = o_G \cdot m(v'_1,\ldots,v'_n)],S_G \rangle,TS$

TABLE 5

Example EXECGAP logic

E ::= a;remote r = E

The testing system TS 102 including the GAP G 154 and the test script T 152, which collectively referred to as programs, P 154. These programs 154 may include a set of locations and a set of values (122, 140). The state, S, of the testing system 102, TS, is the union of the states of the GAP 154 and the test script (148, 152). The state of a program 154, P, is obtained via the mapping function ProgramState. SP in the reduction rules is shorthand for the application of the ProgramState function to obtain the state S of some program P, which either the test script (148, 152), T, or the GAP 154, G. The evaluation relation is defined by the reduction logic shown in Tables 1 through 5.

The object repository (OR) lookup 160 computes the set of properties 122 and their values of a GUI object 118 whose entry in the object repository 128 is labeled p. The OR lookup 160 returns a child object whose properties 122 values match given values of the GUI objects 118 referenced in the test script statements 108. The function type returns the type 124 of a GUI object as it is defined in the GUI framework, the function Member checks if a given method is a member of the set of the methods of a given GUI type 124 $c$, and the function childOf returns true 140 if the GUI object of the type 124 $d$ is a child object of the parent object of the type t, otherwise it returns false 140. The test script (148, 152), T, and the GAP 154, G are members of the testing system 102, TS. Executing the expression e with the initial state ST leads to executing the action 140, a with the initial state SG, and the system TS transitions to a new system TS0. In these rules T and G are programs 154 and S is a state.

Test scripts (202, 204, 216) are run on testing platforms externally to GAPs (208, 210, 212), and therefore cannot access GUI objects 118 as programming objects that exist within the same programs. Using Application Programming Interface (API) calls 112 exported by testing platforms is a primary mode of accessing and manipulating GUI objects 118, and these API calls 112 lead to various run-time errors in test scripts (202, 204, 216) especially when their corresponding GAPs (208, 210, 212) are modified.

For example, a test script statement (202, 204, 216) may include API calls 112 VbWindow("Login").VbButton ("DoIt").Click. The API calls 112 VbWindow and VbButton are exported by the QTP™ testing framework. Executing these API calls 112 identifies a window whose property 122 values match those stored in some OR (128, 214) under the name "Login," and this window contains a button whose property 122 values match those stored in some OR (128, 214) under the name "DoIt". By calling the method Click, this button is pressed. Since API calls 112 take names of the property 122 values of GUI objects 118 as string variables, and if GUI objects are identified only at runtime, it is impossible to apply effective sound checking algorithms. To make matters worse, the names of API calls 112 depend upon the types 124 of GUI objects that the parameters of these calls reference (e.g., the parameter for the API call 112 VbButton should reference a GUI object 118 of the type 124 button), otherwise a runtime exception is thrown. In addition, API calls 112 take names of the property 122 values of GUI objects 118 (as defined in Ors 128, 214) as string input parameter variables, and the values of these input parameters are often known only at runtime, making it impossible to apply sound checking algorithms. These problems are rooted in the absence of type information, and exacerbate the process of detecting and understanding failures in test scripts (202, 204, 216), making maintenance and evolution of these test scripts (202, 204, 216) expensive and prohibitive.

TIGOR 100 includes a type system 102 that includes a tractable syntactic method for proving the absence of certain program behavior, specifically run-time type errors by classifying phrases according to the kinds of values they compute. The type system 102 facilitates programmers to maintain and evolve software effectively by, among other things, detecting errors, providing documentation, and ensuring language safety. In one implementation, the type system 102 of the programming language cannot be used in which the source code of GAPs 154 is written to declare types 124 of references to GUI objects 118 in test scripts (152, 202, 204, 216). Even if the source code was available, the source code may not contain explicit types 124 whose instances are GUI objects 118 for the test scripts (202, 204, 216) on which to perform actions 140. These objects 118 may be created dynamically in GAPs 154 using API calls 112 that are exported by the underlying GUI frameworks 146. The parameters to these API calls 112 are variables that contain values of types 124 of GUI objects 118 as defined by the type system 102 of the underlying GUI framework. For example, to create GUI objects 118 in Windows, programmers invoke the API call 112 CreateWindow passing a string variable that specifies the types 124 of these objects as a first parameter.

TIGOR 100 infers types 124 of references to GUI objects 118 as part of expressions in test scripts (152, 202, 204, 206, 216), and facilitate type checking of these expressions. TIGOR 100 statically detects type errors with a high degree of automation and good precision.

An executed test script expression changes not only the state of the script, but also states of other GAPs 154, to which the script is connected (i.e., whose GUI objects the script accesses and controls). Each statement in test scripts (152, 202, 204, 206, 216), which accesses and manipulates GUI objects 118 include the following operations: (1) navigate to some destination GUI object and (2) invoke methods to perform actions on the object. In one implementation, navigation rules are standard. The rules GS navigate 230 and GS get object 232 show how test scripts (152, 202, 204, 206, 216) manipulate the GAP 154 by initiating a user action 140 'a' on the GAP 154. These rules are evaluated to the reference to GUI object 118 $v$ whose type 124 is 'c' in the test script (152, 202, 204, 206, 216).

GS navigate 230 operates on composite test scripts 216 and composite GUI objects 118 that represent unique identifiers and have mappings 130 to the first GUI object in the second GUI object in the individual first and second applications 154. When GS navigate 230 navigates to the composite GUI object, synchronizes navigation to the first and second GUI objects by constructing first and second operation statements 236 that navigate to the first and second GUI object, and thereby synchronizing operations with the composite GUI object, and the first GUI object and the second GUI object, so that subsequent operations can be performed on the first GUI object and the second GUI object. The synchronization ensures that the individual applications when exercised by the composite application do not fail. The state of the composite GUI object in the composite application may represent different states in the respective applications. Synchronization allows the composite test script to set the composite GUI object value, the states and values for the first and second GUI objects in the first and second applications.

TABLE 6

GS Navigate Logic $\langle G, a, S_G \rangle \; \langle G, S_G \rangle \vdash root = v$
$(T, E[navigate(p)], S_T), TS \mapsto \langle T, E[o_T], S_T[o_T \mapsto (c, \{object \mapsto v\})]\rangle, TS$

TABLE 7

GS Get Object Logic $$\frac{S_T(o_T) = (c, \{object \mapsto o_T\}) \; \langle G, a, S_G \rangle \in TS \; \langle G, S_G \rangle \vdash getObject(o_G, \{(p_i = v_i)\}) = v'}{\langle T, E[o_T], S_T \rangle, TS \mapsto \langle T, E[o_T], S_T[o_T \mapsto (c, \{object \mapsto v'\})] \rangle, TS}$$

When the names of entries in the object repositories 214 are string constants, sound type checking of expressions that reference GUI objects 118 in test scripts (206, 210) may be applied. The type soundness of TIGOR 100 may be shown through two standard theorems, preservation and progress. Type soundness implies that the language's type system is well behaved. In TIGOR, well-typed inferences to GUI objects do not get stuck, that is they pass the type checking algorithm successfully or halt with errors (progress). If a well-typed expression is evaluated, then the resulting expression is also well typed (preservation). The progress and preservation theorems and proofs are presented below.

TABLE 8

Theorem 1 (Preservation)

Theorem 1 (Preservation) If Ø ⊢ e:T, and e↪e', then Ø ⊢ e' :T.
Proof. Preservation is proved by induction on the rules defining the transition system for step-by-step evaluation of TIGOR expressions.
T-NAV By induction let us assume that if e:τ, then e' :τ. Assume that e.navigate (p) :δ. From the typing rule we have e:τ. By induction e' :τ and Γ ⊢ childOf(δ,τ) : true, so by typing rule T-NAV e'.navigate(p):δ.
T-CALL By induction let us assume that if e:τ, then e' :τ. Assume that e.m((v₁,...,vₙ)) : δ. From the typing rule we have e:τ. By induction e' :τ and, so by typing rule T-CALL e' .m((v₁,...,vₙ)) : δ.

TABLE 9

Theorem 2 (Progress)

Theorem 2 (Progress) If Γ ⊢ e:T, then either e is an irreducible value, contains an error subexpression, or else ∃ e' such that e↪e'.
Proof. The proof is by induction on the rules of the type checking. We consider the following cases.
T-NAV Let e'=e.navigate (p) and assume that e' :τ. Since e' is not a value, we must show that ∃e" such that e' ↪e". By induction we have that either e is a value or ∃ε such that e↪ε. In the latter case it follows that e.navigate (p) ↪εnavigate (p). In the former we have v.navigate (p) ↪v.
T-CALL Let e'=e.m((v₁,...,vₙ)): δ and assume that e' :δ. Since e' is not a value, we must show that ∃e" such that e' ↪e". By induction we have that either e is a value or ∃ε such that e↪ε. In the latter case it follows that e.m((v₁,...,vₙ)) ↪ε.m((v₁,...,vₙ)). In the former we have v.m((v₁,...,vₙ)) ↪v.m((v₁,...,vₙ)).

TABLE 10

Example TIGOR type rules

Typing judgments are of the form Γ⊢e:T, read "In the type environment Γ, expression e has type T". The rule T-NAV obtains the type τ of the expression e in Ξ, which is the test script environment.
In the GUI framework typing environment Γ the GUI object of the type δ is the child of the object of the type τ.
Evaluating the expression navigate (p) replaces it with its value of the type δ. The rule T-CALL evaluates the method call m on the GUI object to the type δ.

T-NAV $$\frac{\Xi \vdash e : \tau \; \Gamma \vdash childOf(\delta, \tau) : true \; Type(OR(p)) = \delta}{\Xi \vdash e \cdot navigate(p) : \delta}$$

T-CALL

TABLE 10-continued $$\frac{\Xi \vdash e : \tau \; \Gamma \vdash m : v_1 \times ... \times v_n \to \delta \; m \in Member(\tau)}{\Xi \vdash e \cdot m(v_1, ..., v_n) : \delta}$$

Figure 3:
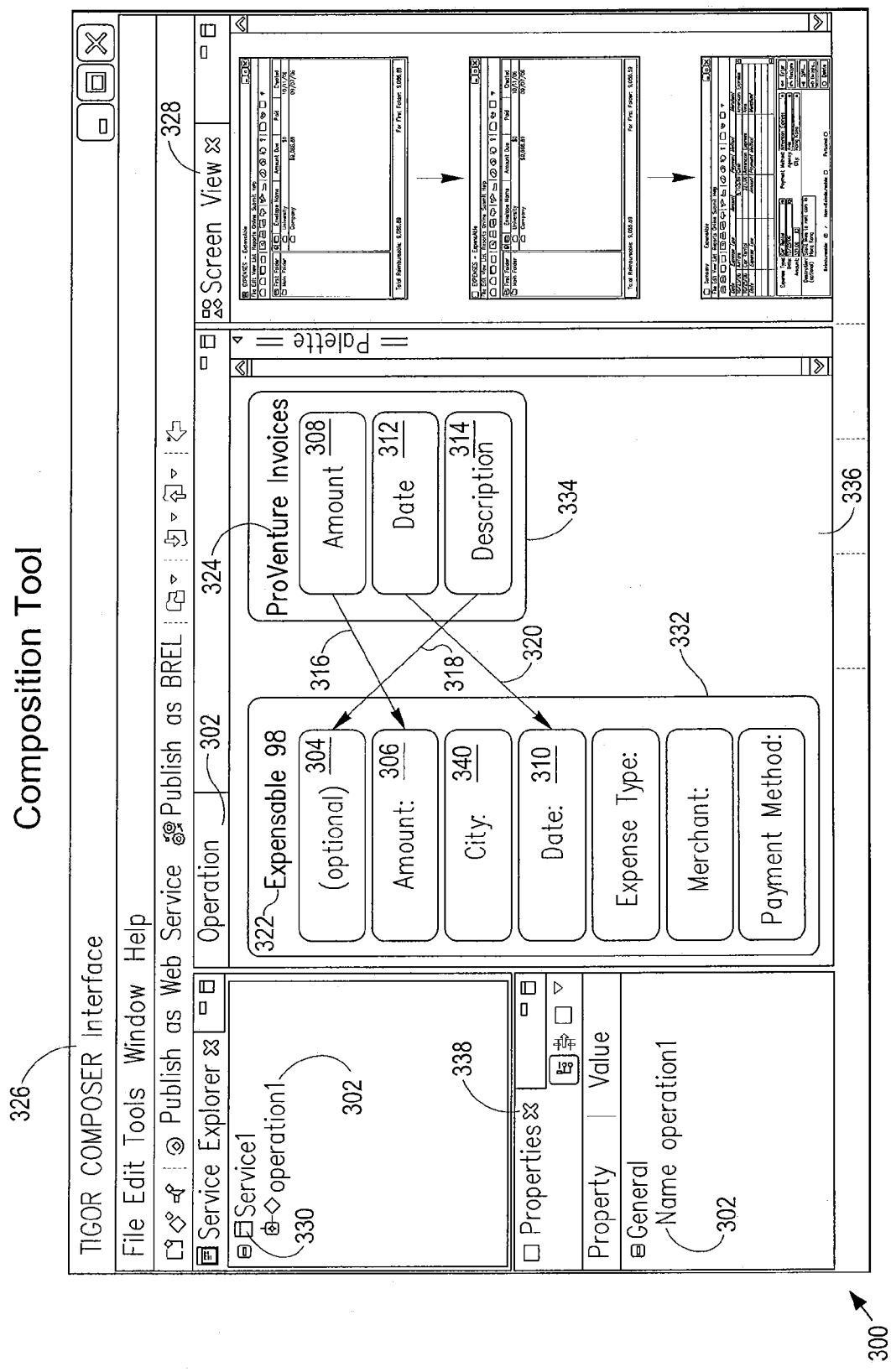
FIG. 3 shows an example user interface for a TIGOR Composer.

FIG. 3 shows an example user interface for a TIGOR Composer 300. TIGOR 100 comprises a composer 300 that facilitates users to design integrated systems by composing GAPs (154, 322, 324) with each other. TIGOR Composer 300 outputs an inferencer message guide 234 of how to compose relevant test scripts 216 by pointing out what operations 302 in test scripts statements (202, 204) that reference GUI objects (118, 304, 306, 308, 310, 312, 314) that exchange information (arrows 316, 318, 320) in integrated systems (208, 210, 322, 324). Specifically, TIGOR composer 300 provides an interface (236, 326) to compose an integrated system (208, 210, 322, 324) that extracts information (118, 304, 306, 308, 310, 312, 314) about ordered items (screen sequences 328) from a GAP 330 service and creates and enters data into referenced GUI objects (118, 304, 306, 308, 310, 312, 314). For example, invoice data is input into a GAP 324 invoice tracker (IT) using this information. After these invoices are paid, the information about the invoices is extracted from GAP 324 IT and entered as expenses into a GAP 322 expense tracker (ET). Using TIGOR Composer 300, a user specifies test scripts statements (202, 204) for the GAPs (322, 324, 330) ET and IT and buystuff (BS). Next, the user enters an expense and an invoice into the GAPs (322, 324) ET and IT, correspondingly. Specifically, the user selects an expense envelope on the first screen of ET, and then double clicks on the entry in the envelope list box. These actions cause ET to switch to the expense entry screen. This and other screens of the GAP are captured and shown in the rightmost tab (screen view 328) of TIGOR Composer 300. The purpose of interacting with GAPs (322, 324) is to allow TIGOR Composer 300 to record the structures of the screens (328, 400, 500, 600, 700, 800) and user actions on the GAPs (322, 324) and then transcode these actions into instructions 302 that facilitate TIGOR to locate corresponding references in test scripts. TIGOR Composer 300 intercepts selected user-level events using the accessibility layer. Since GUI objects cannot be accessed and manipulated as pure programming objects (because GUI objects only support user-level interactions), accessibility technologies are used as a universal mechanism that provides programming access to GUI objects. These events (user-level interactions) allow TIGOR Composer 300 to record the sequence of screens (328, 400, 500, 600, 700, 800) that the user goes through as well as the actions that the user performs on GUI objects (118, 304, 306, 308, 310, 312, 314). At the design time, the user may specify how to exchange data (316, 318, 320) between components. Specifically, the user determines what GUI objects (118, 304, 306, 308, 310, 312, 314) will receive the values of the properties 338 of the web service BS and the values of GUI objects of other GAPs. For example, the value of the property Item of the GAP 330 service BS should be put into the GUI object labeled Description 314 of the invoice screen of GAP 324 IT, which in turn should be put into the GUI object labeled (optional) 304 of the expense screen of GAP 322 ET.

To create mappings 130 between these properties 122 and GUI objects 118, the user moves the cursor over some GUI object 118 of a GAP (208, 210), and TIGOR Composer 300 uses the accessibility API calls 112 to obtain information about the GUI objects. To confirm the selection, a frame (332, 334) is drawn around the object with the tooltip window displaying the information about the selected object. Then, the user clicks the mouse button and drags this object (or rather its image) onto the TIGOR Composer dataflow palette 336. After releasing the mouse button, the dragged object is dropped onto the TIGOR Composer dataflow palette 336 under the label of the corresponding component. Once the user has dragged-and-dropped all desired GUI objects (118, 304, 306, 308, 310, 312, 314), these objects are connected with arrows (316, 318, 320) that specify the directions of data exchanges. For example, by drawing an arrow between the object Description 314 of the GAP 324 IT and the object (optional) 304 of ET, the user specifies that the data from the corresponding GUI object 314 of GAP 324 IT will be transferred to the GUI object 304 of GAP 322 ET. In one implementation, TIGOR 100 produces type inferencer message guides (162, 234) that explain how to transform the data during data exchange (316, 318, 320) between the GAPS (322, 324). Once dataflow mappings (130, 316, 318, 320) between GUI objects (118, 304, 306, 308, 310, 312, 314) are specified, TIGOR 100 uses the information captured for each screen 328 and input objects to locate and type expression in test scripts statements (202, 204) that reference these GUI objects. The information about GUI objects (118, 304, 306, 308, 310, 312, 314) that participate in data exchange (316, 318, 320) is used to locate references to these objects in test scripts statements (202, 204), thereby enabling test engineers to reason effectively about using the test scripts statements (202, 204) to compose composed test scripts 216.

TIGOR 100 infers GUI objects types. Once the test script is loaded (and parsed) and the model of the GUI of a GAP is extracted using the accessibility layer, the type inference logic 116 resolves types for references to GUI objects in the running GAP. The user can select a reference in the test script to view its corresponding GUI object on the GAPs (208, 210, 212, 322, 324). When a reference is selected, a frame (332, 334) is drawn around the GUI object 118 with the tooltip window displaying the type information about the selected object, and subsequently about its reference. In addition, the user may cursor over any GUI object. TIGOR composer 300 displays a context menu that allows the user to check to see what references in the test script to which a selected object is mapped.

Figure 4:
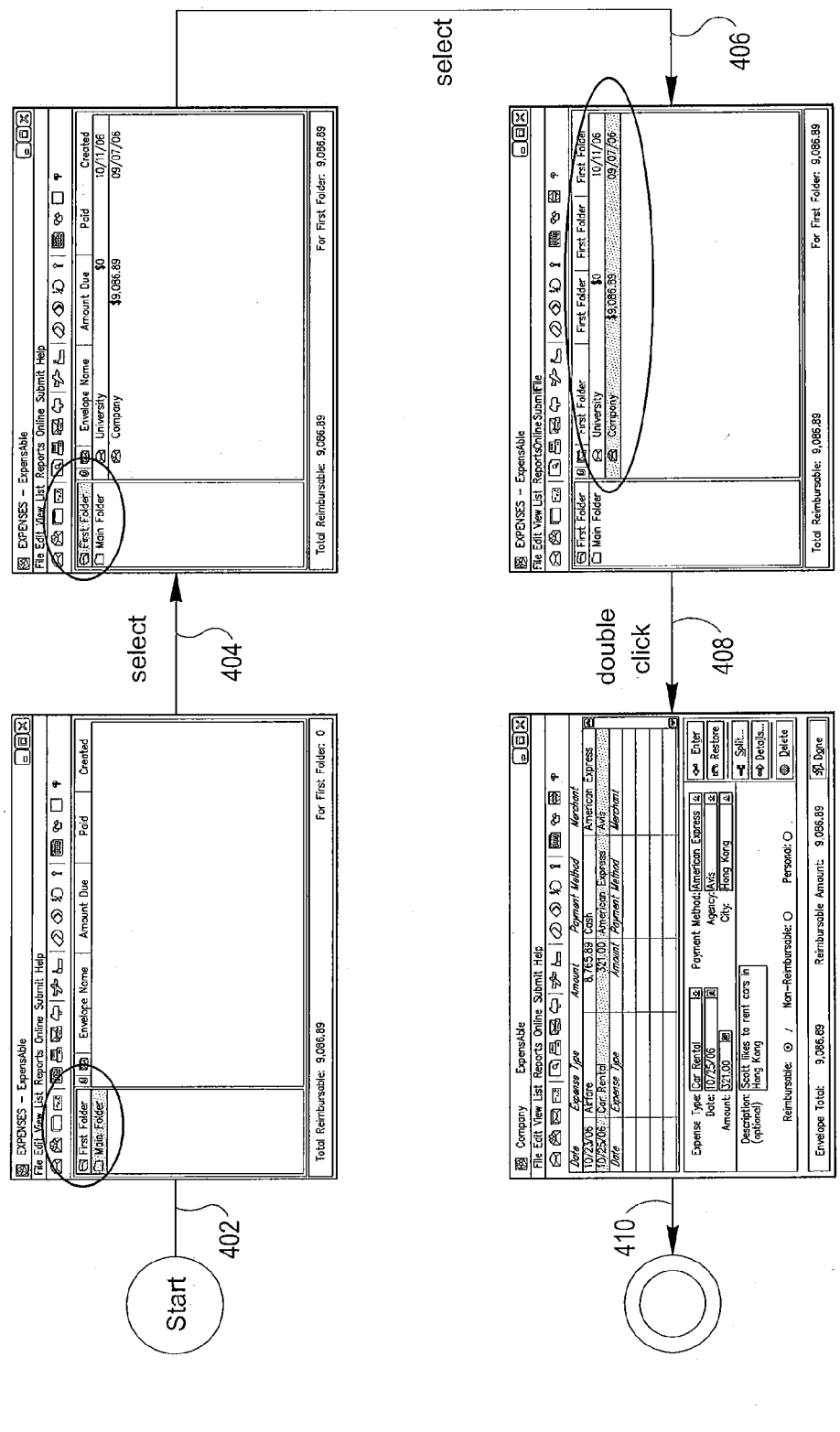
FIG. 4 illustrates a navigation sequence to destination GUI objects
Figure 5:
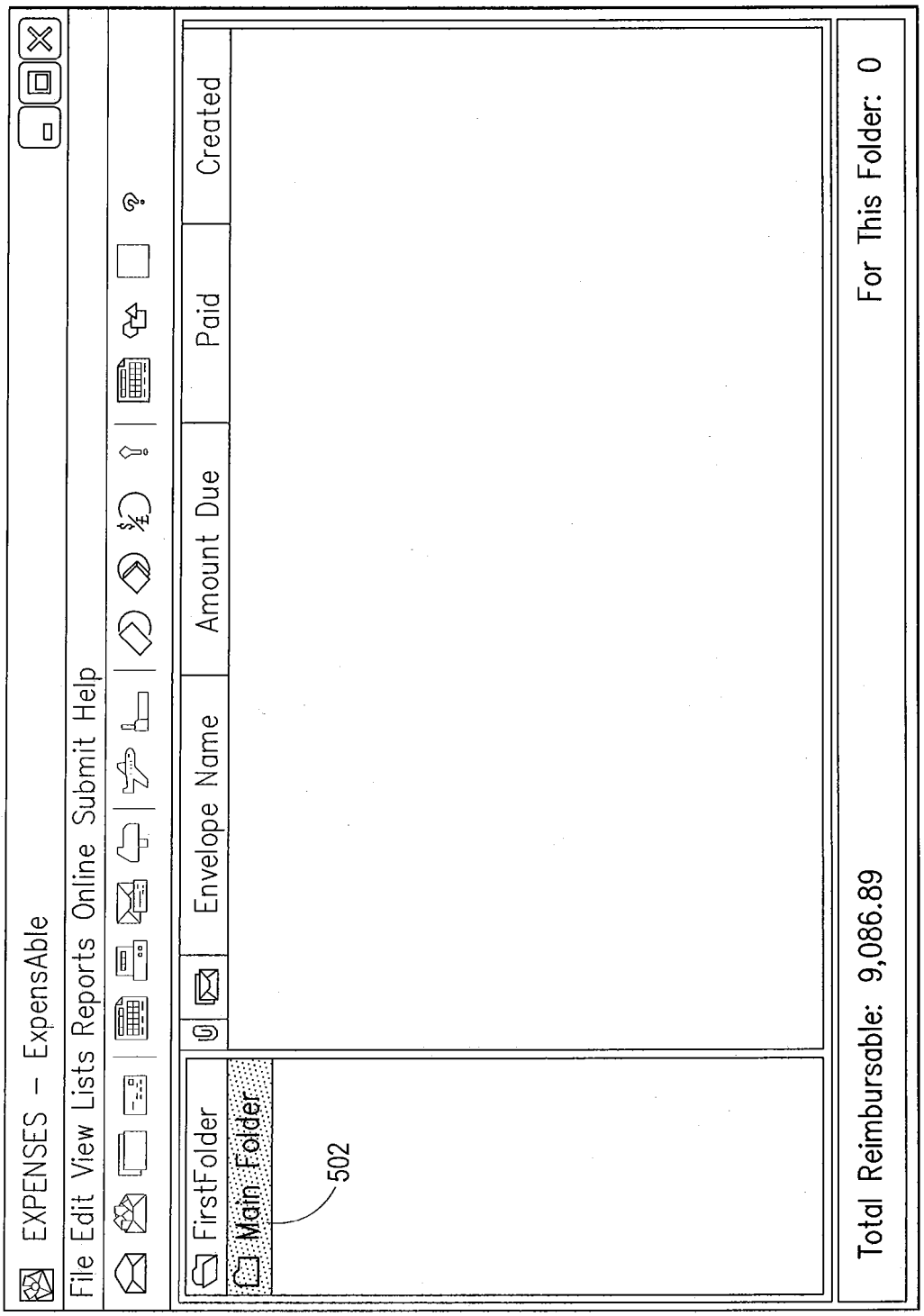
FIG. 5 illustrates a sample first GUI object reference in a sequence to a destination GUI object.
Figure 7:
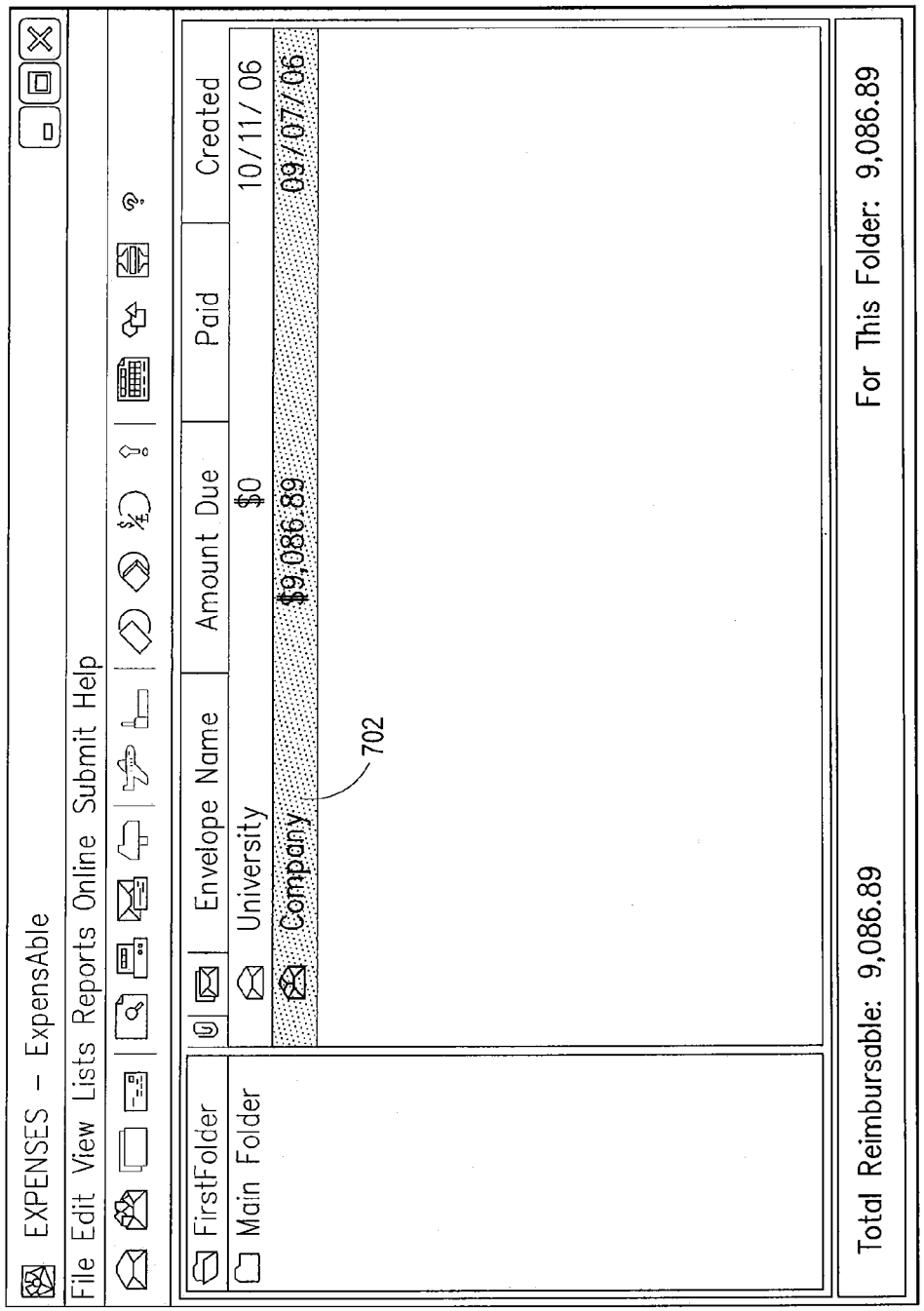
FIG. 7 shows a sample third GUI object reference in a sequence to a destination GUI object.
Figure 8:
FIG. 8 shows a sample fourth GUI object reference in a sequence to a destination GUI object.

FIG. 4 illustrates a navigation sequence 400 (402, 404, 406, 408, 410) to destination GUI objects (118, 804, 806). The screen view 324 captures the navigation sequence 400 in TIGOR Composer 300. FIG. 5 shows a sample first GUI object reference 502 in a sequence to destination GUI objects. FIG. 6 shows a sample second GUI object reference 604 in a sequence (602, 604, 702, 802) to destination GUI objects (118, 804, 806) (e.g., amount and description). FIG. 7 shows a sample third GUI object reference 702 in a sequence (602, 604, 702, 802) to destination GUI objects (118, 804, 806). FIG. 8 shows a sample fourth GUI object reference 802 in a sequence (602, 604, 702, 802) to destination GUI objects (118, 804, 806).

Figure 9:
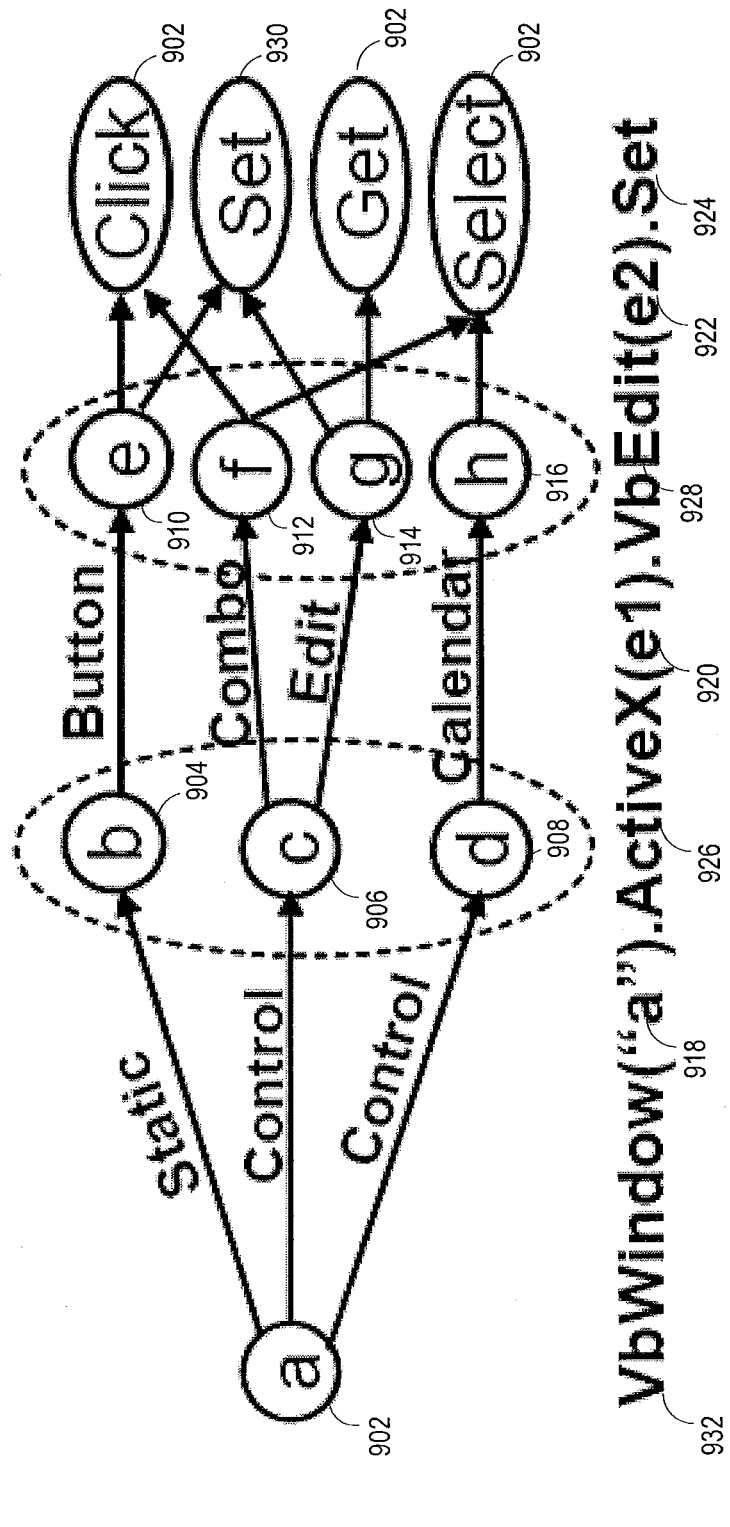
FIG. 9 shows a sample illustration of inferring references to GUI objects

FIG. 9 shows a sample illustration of inferring references to GUI objects. FIG. 9 shows a GUI tree model 900 whose nodes (depicted as circles with letters—902, 904, 906, 908, 910, 912, 914, 916) are GUI objects 118 labeled with their names in some object repository 128, the edges describe the containment hierarchy and they are labeled with the types 124 of GUI objects that these edges are incident to. For example, the GUI object labeled 'e' 910 has the type Button, and it is contained in the GUI object labeled as 'b' 904 whose type is Static, which is contained in the parent object labeled 'a' 902.

In the expression VbWindow("a").ActiveX(e1).VbEdit (e2).Set, navigation is started from the GUI object whose object repository 128 reference is named 'a' 918. Expressions 'e1' 920 and 'e2' 922 compute values of the intermediate nodes in the traversal path at runtime. These expressions are parameters to the API calls 112 ActiveX 926 and VbEdit 928, respectively, and these calls handle GUI objects 118 of the types 124 Control and Edit. If e1 920 and e2 922 are evaluated to the names "c" 906 and "g" 914, then this statement will execute correctly, otherwise a runtime exception will be thrown. The type inferencer logic 116 decides which GUI objects should be visited from the node 'a' 902 in the tree 900 in order to reach a destination object 118 that exposes the method Set 930. When visiting GUI objects 118 in a path expression, the types of these objects should match the API calls 112 that reference these objects 118. By finding all paths leading to destination objects while satisfying type constraints, TIGOR 100 determines whether the navigation expression is correct. If no path exists, then the expression is incorrect. If one or more paths exists, the type inferencer logic 116 outputs the values to which the expressions e1 920 and e2 922 may be evaluated.

Figure 10:
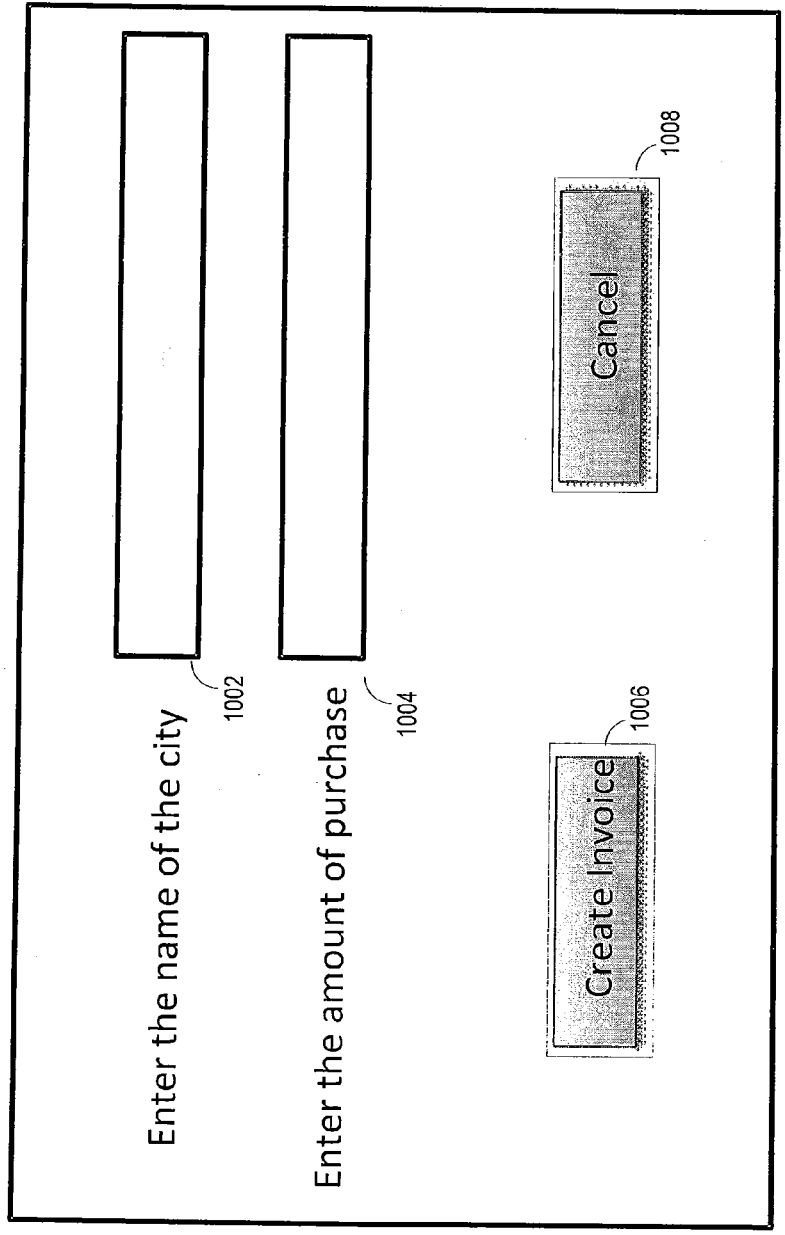
FIG. 10 shows sample composed GUI object references in a composed application.

FIG. 10 shows sample composed GUI object references 1000 in a composed application 216. GUI objects 118 common to multiple applications, in one implementation, includes city name (340, 1002), purchase amount (306, 308, 1004), and user selectable application control buttons (1006, 1008). The composed GUI object references 1000 manage the GUI object typing 124 for the multiple GUI objects referenced (306, 308, 340) by the composed GUI object references (1002, 1004). For example, the purchase amount 1004 GUI object refers to the amount GUI objects (306, 308) in the separate GAPs (322, 324), and TIGOR 100 uses the composed GUI object references 1000 to manage type translations for data exchanges between GUI objects (304, 306, 308, 310, 312, 314, 340) in separate GAPs (322, 324).

Figure 11:
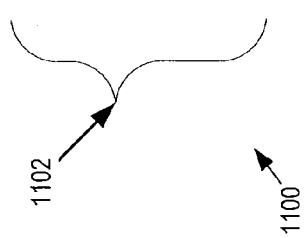
FIG. 11 shows a sample sequence of test script statements for a GAP.

FIG. 11 shows a sample sequence of test script statements 1100 for a first GAP 322. The test script statements 1102 may include test script statements that reference GUI objects 118 common to multiple applications, including city name (340, 1002), and amount (306, 308, 1004).

FIG. 12 shows another sample sequence of test script statements 1200 for a first GAP 324. The test script statements 1202 may reference GUI objects 118 of the multiple applications, including city name (340, 1002), and amount (306, 308, 1004).

FIG. 13 shows a sample composed sequence of test script statements 1300 for a composed GAP 212. The composed test script statements 1302 may include test script statements 216 that reference GUI objects 118 of the multiple applications, including city name (340, 1002), and amount (306, 308, 1004). The composed test script statements 1302 manage type translations between GAPs (208, 210, 212, 322, 324) and report type mismatches for referenced GUI objects 118 of the multiple applications.

Figure 14:
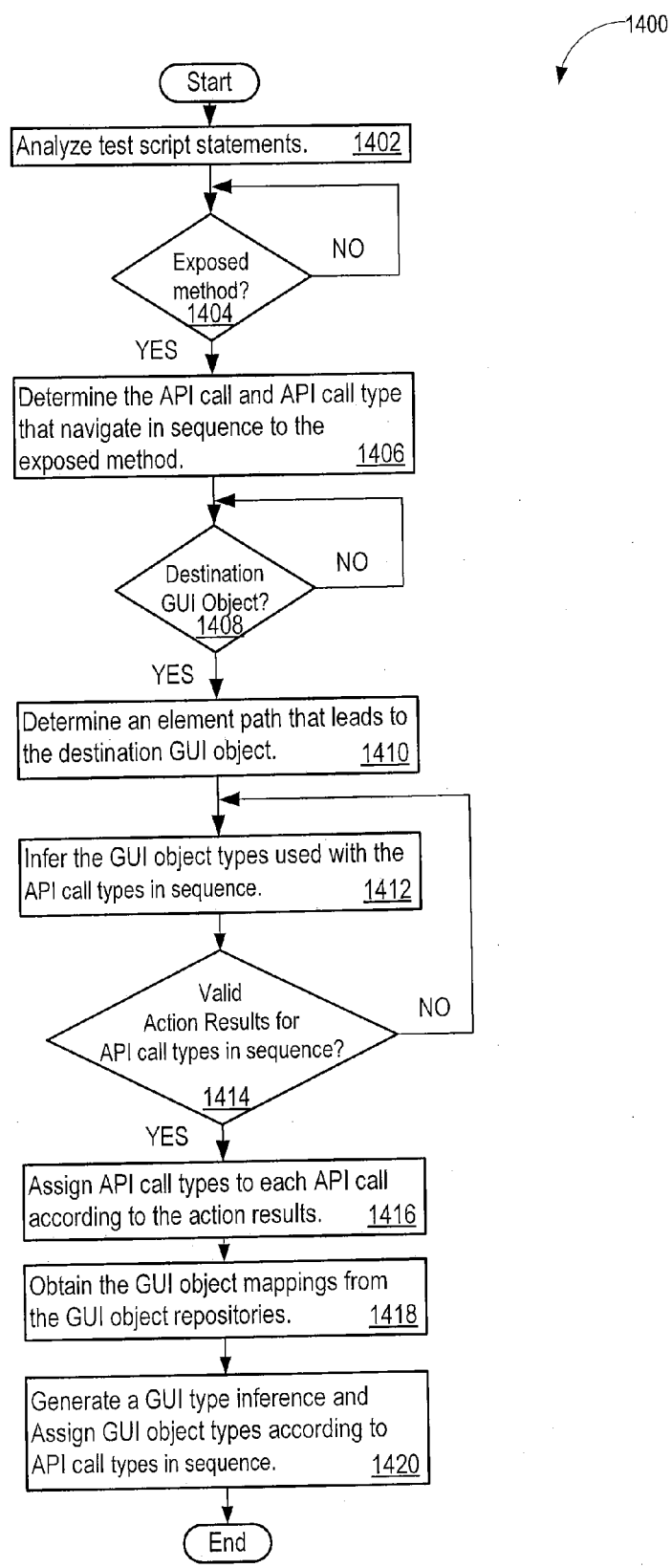
FIG. 14 shows sample logic flow that generates a GUI type inference.

FIG. 14 shows a sample logic flow 1400 that may be performed by the type inferencer logic 116 in order to generate a GUI type inference. The logic flow 1400 includes the following actions: analyze test script statements (202, 204) (1402) to determine: an exposed method 110 (1404) expressed in the test script statement (108, 208, 210); API calls 112 characterized by API call types 114 (1406) that navigate in sequence to the exposed method 110. The logic flow 1400 may determine a destination GUI object (1408) that exposes the exposed method 110, find an element path (1410) between sequential GUI objects in a GUI tree 120, where the element path leads to the destination GUI object, where the sequential GUI objects are characterized by GUI object types (1412); and determine whether the API call types in sequence are compatible with the GUI object types in sequence (1414). The logic 116 to determine the API call types 114 obtain validated action results for actions 140 performed by the API calls 112 on GUI object types 124 stored in the GUI object repositories 128; and assign API call types 114 (1416) to each API call 112 according to the action results 140 that specify valid API calls 112 useable to perform actions on particular GUI object types (124, 142). The logic 116 to determine the GUI object types 124 obtain, from a GUI object repositories 128, mappings 130 of GUI object types 124 (1418), where each of the mappings 130 comprise properties of a GUI object type 124, and assign GUI object types 124 (1420) to each GUI object 118 according to the API call types 114 in sequence determined to be compatible with the GUI object types in sequence 142. In one implementation, the API call types 114 are in sequence with the GUI object types 142 determined to be compatible with the API call types 114.

In another example, referring briefly to FIG. 9, the type inferencer logic 116 may determine an exposed method 110 (1404) 'Set' 930 expressed in the test script statement (108, 208, 210) VbWindow ("a").ActiveX(e1).VbEdit(e2).Set. The type inferencer logic 116 may determine a destination GUI object (1408) 'e2' (922, 910, 914) that exposes the exposed method 110 'Set' (924, 930). The element path (1410) between sequential GUI objects in a GUI tree 120, (e.g., VbWindow 932, "a" 918, ActiveX 926, e1 920, and VbEdit 928) leads to the destination GUI object 'e2' 922. In one implementation, the sequential GUI objects (e.g., "a" 918, "e1" 920, "e2" 922), (e.g., "a" 918, "b" 904, "c" 906, "e2" 922), (e.g., "a" 918, "b" 904, "e" 910), (e.g., "a" 918, "c" 906, "g" 914) are characterized by GUI object types (e.g., static, control, button, combo, edit, calendar) (1412).

The API call types (e.g., static, control, button, combo, edit, calendar) in sequence are analyzed for compatibility with the GUI object types (e.g., static, control, button, combo, edit, calendar) in sequence (1414). For example, ActiveX 926 includes static and control as API call types, and VbEdit 928 includes button, combo, edit, calendar as API call types. API call types in sequence may include a static-button sequence, a control-combo sequence, a control-edit sequence and a control-calendar sequence. The logic 116 to determine the API call types 114 obtains validated action results for actions 140 performed by the API calls 112 on GUI object types 124 stored in the GUI object repositories 128.

In one implementation, the logic 116 finds multiple GUI object interaction paths validated as useable GUI object interaction paths from the multiple GUI object interaction paths that control the actions performed on the sequential GUI objects; and determine a number of GUI object interactions in each of the useable GUI object interaction paths. The logic 116 further causes the processor to: select from the useable GUI object interaction paths, a first path selected having the least number of GUI object interactions of the useable GUI object interaction paths; or some combination of GUI object interactions of the useable GUI object interaction paths. The logic 116 further causes the processor to: select from the useable GUI object interaction paths, a first path selected having the greatest number of GUI object interactions of the useable GUI object interaction paths; or some combination of GUI object interactions of the useable GUI object interaction paths. The logic 116 further causes the processor to: determine the type of the exposed method in the useable GUI object interaction paths, where the useable GUI object interaction paths each extend from a root node representing the destination GUI object that exposes the exposed method. The test script statement references GUI objects using the GUI objects properties of the GUI objects, the properties comprising: name; location; color; size, or any combination thereof.

FIG. 15 shows type inference message guide repository (164, 234) messages 1500. In one implementation, the type inferencer returns multiple type inference results and TIGOR provides selectable options for the GUI object types for the GAPs (332, 334) when the type inferencer returns multiple type inference results. The type inferencer may report whether the composed test script statements may select the wrong GUI object type because multiple type inference results were returned by the type inferencer.

In one implementation, the GUI object repositories 128 are directed to open source subject GAPs based on the following criteria: easy-to-understand domain, limited size of GUI (less than 200 GUI objects), and two successive releases of GAPs with modified GUI objects. Example GAPs useable with TIGOR 100 include: Twister (version 2.0) is a real-time stock quote downloading programming environment that allows users to write programs that download stock quotes; mRemote (version 1.0) facilitates users to manage remote connections in a single place by supporting various protocols (e.g., SSH, Telnet, and HTTP/S); University Directory (version 1.0) allows users to obtain data on different universities; and Budget Tracker (version 1.06) is a program for tracking budget categories, budget planning for each month and keeping track of expenses.

In one implementation, the type inferencer 222 includes a machine-readable medium 106 and get object logic (116, 232), stored on the machine-readable medium, that when executed by a processor, cause the processor to: identify a first GUI object 118 referenced by a first test script 108 and implemented in a first application and a identify a second GUI object 118 referenced by a second test script 108 and implemented in a second application. The type inferencer 222 may further include script navigator logic (116, 230), stored on the machine-readable medium, that when executed by the processor, causes the processor to: obtain the first test script for the first application and the second test script for the second application, and a first result 140 and a second result 140 of a first and a second action 140 performed on the first GUI object and the second GUI object 118 implemented in the first application and the second application 154. The type inferencer 222 may identify a first and a second sequence 142 of operation statements comprising a first and a second operation statement of the first and the second test scripts (108, 152). The type inferencer 222 may establish a composed GUI object reference that maps the first and the second GUI objects to a composed GUI object (1002, 1004) in a composed application 212. The type inferencer logic 116 further causes the processor to: retrieve mappings 130 of first and second GUI object types 124 and type constraints for the first and the second GUI objects 118 from a first GUI object and a second GUI object repositories 128. The type inferencer logic 116 further causes the processor to: create a composed GUI object type mapping 130 of the first and the second GUI object types 124 and type constraints to a composed GUI object type and type constraints for the composed GUI object. The type inferencer logic 116 further causes the processor to: create a composed test script 216 comprising the first and second sequence of operation statements and a composite sequence of operation statements that, when executed by the processor, cause the processor to synchronize states of the first, the second, and the composed GUI objects.

The first result and the second result are obtained by the type inferencer, and the first and the second sequence of operation statements are identified, by evaluating the sequence of operation statements of the first and the second test scripts to identify those sequence of operation statements that, when executed by the processor, cause the processor to synchronize the states of the first GUI object and the second GUI object. The first GUI object and the second GUI object are referred to in GAPs that compose a composed application.

The composed application comprises composed operation statements that when executed by the processor cause the processor to: perform actions on the first GUI object and the second GUI object of the first and the second applications. The type inferencer logic further causes the processor to: store the composed GUI object type mapping in a composed GUI object repository. The first and the second GUI object type and type constraints of the first and the second GUI objects are mapped, by identifying the sequence of operation statements, comprising the first and second sequence of operation statements, that navigate to the first and the second GUI objects and satisfy the type constraints of the first and the second GUI objects, in order to validate a navigation expression implemented by the first and second sequence of operation statements when executed by the processor. The first and second test scripts comprise operation statements, that when executed by the processor, perform actions on the first and the second GUI objects of the first and the second applications.

The type inferencer resolves the GUI type differences between the multiple applications referred to in the composed test script, and provides automatic reasoning so that the amount of work that would otherwise be done by manual inspection is significantly decreased. For example, where there are two applications and in one application you have a GUI object that holds values of salary as an integer type GUI object and you have a second application that has a text box or combo box that also holds the values of salary but the GUI object type is string. The operations that are performed on these objects and how you treat the values of the objects will be different depending on the GUI object type, integer or a string. The type inferencer infers the values of the GUI objects in the multiple applications for the composed test script so that the operations performed on the GUI objects of the multiple applications correspond to and/or match the inferred GUI object types (data types). The GUI objects transfer data between corresponding applications. When the inferred GUI object type is incorrect for one of the applications as referenced in the composed test script, the type inferencer issues a warning and identifies the location in the composed test script where the type of the GUI object must be revised.

Accessibility tools are used to identify and extract information about types of the GUI objects in the multiple individual applications. Analyze the test scripts for the individual applications, to obtain information about links objects referred in the test scripts to the GUI objects in the corresponding application. For example, a first application in the second application, where in the first application the GUI object is a text box and in the second application the GUI object is a combo box for each application there is a corresponding test script, that have statements that reference GUI objects in each of the first and the second application. The composed test script includes statements that reference the GUI object as a text box in the first application and that reference the GUI object as a combo box in the second application. Combining the first and the second application, into a mega-application that implements a uniform GUI that controls and manipulates the two GUIs of the first and second applications. The composed GUI object implements a uniform GUI object that represents the GUI objects in the first and second applications. The composed test script executes the composed GUI object. When the value of the composed GUI object is entered in the composed GUI the value is translated to the proper data type and type constraints are satisfied in the corresponding first and second applications that compose the composed application. The inferencer generates a sequence of composed operations statements that perform actions on the GUI objects in order to properly update the value of the GUI objects in the corresponding applications.

The systems may be implemented in many different ways. For example, although some features are shown stored in computer-readable memories (e.g., as logic implemented as computer-executable instructions or as data structures in memory), all or part of the systems, logic, and data structures may be stored on, distributed across, or read from other machine-readable media. The media may include hard disks, floppy disks, CD-ROMs, ROM and RAM. The systems may be implemented in software, hardware, or a combination of software and hardware.

Furthermore, the systems may be implemented with additional, different, or fewer components. As one example, a processor or any other logic may be implemented with a microprocessor, a microcontroller, a DSP, an application specific integrated circuit (ASIC), program instructions, discrete analog or digital logic, or a combination of other types of circuits or logic. As another example, memories may be DRAM, SRAM, Flash or any other type of memory. The systems may be distributed among multiple components, such as among multiple processors and memories, optionally including multiple distributed processing systems. Logic, such as programs or circuitry, may be combined or split among multiple programs, distributed across several memories and processors, and may be implemented in or as a function library, such as a dynamic link library (DLL) or other shared library.

Choosing manual testing of GAPs versus writing test scripts is a matter of trade-offs between the development effort to create test scripts and their projected level of reuse. The GUIs of most GAPs are changed significantly in the first several releases making the effort of writing test scripts worthless. Only when GAPs stabilize, the effort that test engineers put in writing test scripts will be amortized over the future use of the test scripts. TIGOR can foster test automation simply because TIGOR gives a certain degree of assurance that test scripts can be reused in later regression testing. Using TIGOR allows test personnel to reduce costs significantly while keeping test development overhead within acceptable limits. Specifically, clients may be given an option that they pay additional cost for creating test scripts, and this cost may be amortized over the lifetime of the GAPs by using TIGOR that facilitates test scripts to run on consecutive releases of these GAPs.

Accessibility technologies provide different aids to disabled computer users (e.g., screen readers for the visually impaired). Most computing platforms include accessibility technologies since it is mandated by the law. Accessibility technologies provide a wealth of sophisticated services required to retrieve attributes of GUI objects, set and retrieve their values, and generate and intercept different events. The MSAA for Windows, however, using a different accessibility technology will yield similar results. Even though there is no standard for accessibility API calls, different technologies offer similar API calls, suggesting slow convergence towards a common programming standard for accessibility technologies.

The main idea of most implementations of accessibility technologies is that GUI objects expose a well-known interface that exports methods for accessing and manipulating these objects. For example, a Windows GUI object should implement the (Accessible interface in order to be accessed and controlled using the Microsoft Active Accessibility (MSAA) API calls. In TIGOR, accessibility serves as a uniform reflective connector that facilitates test scripts to access and control GUI objects of GAPs.

Using accessibility technologies, programmers can also register callback functions for different events produced by GUI objects thereby obtaining timely information about states of the GUI objects. For example, if a GUI object receives an incorrect input and the GAP shows an error message dialog informing the user about the mistake, then a previously registered callback can intercept this event signaling that the message dialog is being created, dismiss it, and send an "illegal input" message to the tool that controls the GAP.

When a target GAP is started, the accessibility layer loads predefined hook libraries in the process space of this applications and registers addresses of callbacks that should be invoked in response to specified events. Since hooks "live" in the process spaces of GAPs, their callbacks can affect every aspect of execution of these GAPs.

Hooks are user-defined libraries that contain callback functions (or simply callbacks), which are written in accordance with certain rules dictated by accessibility technologies. Hooks are important because they facilitate users to extend the functionality of GAPs, specifically to integrate them with GAPs without changing their source code. Writing hooks does not require any knowledge about the source code of GAPs. In our approach, a hook library is generic for all GAPs, and its goal is to listen to events generated by the GAP into which this hook is injected as well as to execute instructions received from integrated systems. An example of an instruction is to disable a button until certain event occurs. The power of hook libraries is in changing the functionalities of existing GAPs without modifying their source code. Main functions of the generic hook are to receive commands to perform actions on GUI objects, to report events that occur within GAPs, and to invoke predefined functions in response to certain commands and events. Since accessibility layers are supported by their respective vendors and hooks are technical instruments which are parts of accessibility layers, using hooks is legitimate and accepted to control and manipulate GAPs. In addition, writing and using hooks is easy since programmers use high-level accessibility API calls, and may avoid the complexity of low-level binary rewriting techniques.

While various embodiments of the type inferencer have been described, it will be apparent to those of ordinary skill in the art that many more embodiments and implementations are possible within the scope of the invention. Accordingly, the invention is not to be restricted except in light of the attached claims and their equivalents.

What is claimed:

1. A type checking method comprising:
analyzing, using logic executed by a processor, a test script statement stored in a non-transitory memory coupled to the processor to determine:
an exposed method expressed in the test script statement;
Application Programming Interface (API) calls, executable by the processor, characterized by API call types that navigate in sequence to the exposed method;
a destination Graphical User Interface (GUI) object that exposes the exposed method;
finding, using the logic executed by the processor, an element path between sequential GUI objects in a GUI tree, where the element path leads to the destination GUI object, where the sequential GUI objects are characterized by GUI object types;
determining, using the logic executed by the processor, whether the API call types in sequence are compatible with the GUI object types in sequence;
obtaining, from a GUI object repository, validated action result for actions performed by the API calls on GUI object types in sequence;
assigning API call types to each API call according to the action results that specify valid API calls useable to perform actions on particular GUI object types;
obtaining, from the GUI object repository, mappings of GUI object types, where each of the mappings comprise properties of a GUI object type;
assigning GUI object types to each GUI object according to the API call types in sequence determined to be compatible with the GUI object types in sequence;
determining a GUI object interactions count for the sequential GUI objects based on a configurable number of GUI object interactions for the sequential GUI objects; and
generating a type inferencer message guide that explain how to transform data during data exchange between the GUI object.

2. The method of claim 1, further comprising:
finding multiple GUI object interaction paths that perform actions on the sequential GUI objects;
validating useable GUI object interaction paths from the multiple GUI object interaction paths that control the actions performed on the sequential GUI objects; and determining a number of GUI object interactions in each of the useable GUI object interaction paths.

3. The method of claim 2, further comprising: selecting from the useable GUI object interaction paths, a first path selected having the least number of GUI object interactions of the useable GUI object interaction paths.

4. The method of claim 2, further comprising: selecting from the useable GUI object interaction paths, a first path selected having the greatest number of GUI object interactions of the useable GUI object interaction paths.

5. The method of claim 2, further comprising: determining the type of the exposed method in the useable GUI object interaction paths, where the useable GUI object interaction paths each extend from a root node representing the destination GUI object that exposes the exposed method, the top container window, or both.

6. The method of claim 1, where the test script statement references GUI objects using the properties of the GUI objects, the GUI objects properties comprising: name; location; color; size, or any combination thereof.

7. A product, the product comprising:
a non-transitory machine-readable medium;
logic, stored on the machine-readable medium, that when executed by a processor, cause the processor to:
analyze a test script statement to determine:
an exposed method expressed in the test script statement;
Application Programming Interface (API) calls, executable by the processor, characterized by API call types that navigate in sequence to the exposed method;
determine a destination Graphical User Interface (GUI) object that exposes the exposed method;
find an element path between sequential GUI objects in a GUI tree, where the element path leads to the destination GUI object, where the sequential GUI objects are characterized by GUI object types;
determine whether the API call types in sequence are compatible with the GUI object types in sequence;
obtain, from a GUI object repository, validated action result for actions performed by the API calls on GUI object types in sequence;
assign API call types to each API call according to the action results that specify valid API calls useable to perform actions on particular GUI object types;
obtain, from the GUI object repository, mappings of GUI object types, where each of the mappings comprise properties of a GUI object type;
assign GUI object types to each GUI object according to the API call types in sequence determined to be compatible with the GUI object types in sequence;
determine a GUI object interactions count for the sequential GUI objects based on a configurable number of GUI object interactions for the sequential GUI objects; and
generate a type inferencer message guide that explain how to transform data during data exchange between the GUI object.

8. The product of claim 7, where the logic to find multiple GUI object interaction paths, that when executed by a processor, further causes the processor to: validate useable GUI object interaction paths from the multiple GUI object interaction paths that control the actions performed on the sequential GUI objects; and determine a number of GUI object interactions in each of the useable GUI object interaction paths.

9. The product of claim 8, where the logic further causes the processor to: select from the useable GUI object interaction paths, a first path selected having the least number of GUI object interactions of the useable GUI object interaction paths; or some combination of GUI object interactions of the useable GUI object interaction paths.

10. The product of claim 8, where the logic further causes the processor to: select from the useable GUI object interaction paths, a first path selected having the greatest number of GUI object interactions of the useable GUI object interaction paths; or some combination of GUI object interactions of the useable GUI object interaction paths.

11. The product of claim 8, where the logic further causes the processor to: determine the type of the exposed method in the useable GUI object interaction paths, where the useable GUI object interaction paths each extend from a root node representing the destination GUI object that exposes the exposed method.

12. The product of claim 7, where the test script statement references GUI objects using the GUI objects properties of the GUI objects, the properties comprising: name; location; color; size, or any combination thereof.

13. A system, the system comprising:
a processor;
a memory coupled to the processor, the memory comprising: a test script statement, comprising:
an exposed method expressed in the test script statement;
Application Programming Interface (API) calls characterized by API call types that navigate in sequence to the exposed method;
logic, stored in the memory, that when executed by the processor, causes the processor to: determine a destination Graphical User Interface (GUI) object that exposes the exposed method;
find an element path between sequential GUI objects in a GUI tree, where the element path leads to the destination GUI object, where the sequential GUI objects are characterized by GUI object types;
determine whether the API call types in the element path between sequential GUI objects are compatible with the GUI object types in the sequence;
obtaining, from a GUI object repository, validated action result for actions performed by the API calls on GUI object types in sequence;
calculating API call type assignments for each API call according to the action results that specify valid API calls useable to perform actions on particular GUI object types;
obtaining, from the GUI object repository, mappings of GUI object types, where each of the mappings comprise properties of a GUI object type;
assigning GUI object types to each GUI object according to the API call types in sequence determined to be compatible with the GUI object types in sequence;
determining a GUI object interactions count for the sequential GUI objects based on a configurable number of GUI object interactions for the sequential GUI objects; and
generating a type inferencer message guide that explain how to transform data during data exchange between the GUI object.

14. The system of claim 13, where the logic further causes the processor to:
find multiple GUI object interaction paths that identify API calls that perform actions on the sequential GUI objects;
validate useable GUI object interaction paths from the multiple GUI object interaction paths that control the actions performed on the sequential GUI objects; and
determine a number of GUI object interactions in each of the useable GUI object interaction paths.

15. The system of claim 14, where the logic further causes the processor to: select from the useable GUI object interaction paths, a first path selected having the least number of GUI object interactions of the useable GUI object interaction paths.

16. The system of claim 14, where the logic further causes the processor to: select from the useable GUI object interaction paths, a first path selected having the greatest number of GUI object interactions of the useable GUI object interaction paths.

17. The system of claim 14, where the logic further causes the processor to: determine the type of the exposed method in the useable GUI object interaction paths, where the useable GUI object interaction paths each extend from a root node representing the destination GUI object that exposes the exposed method.

18. The system of claim 13, where the test script statement references GUI objects using the properties of the GUI objects, the GUI objects properties comprising: name; location; color; size, or any combination thereof.

* * * * *